Dec. 31, 1968 W. W. HANSFORD ET AL 3,418,944
SUBFLOOR CONVEYOR SWITCH CONTROL MEANS
Filed Jan. 21, 1966 Sheet 1 of 3

INVENTORS:
William W. Hansford
John F. Bryan, Jr.
Jesse B. Hutchinson
BY Wofford & Felsman
ATTORNEYS

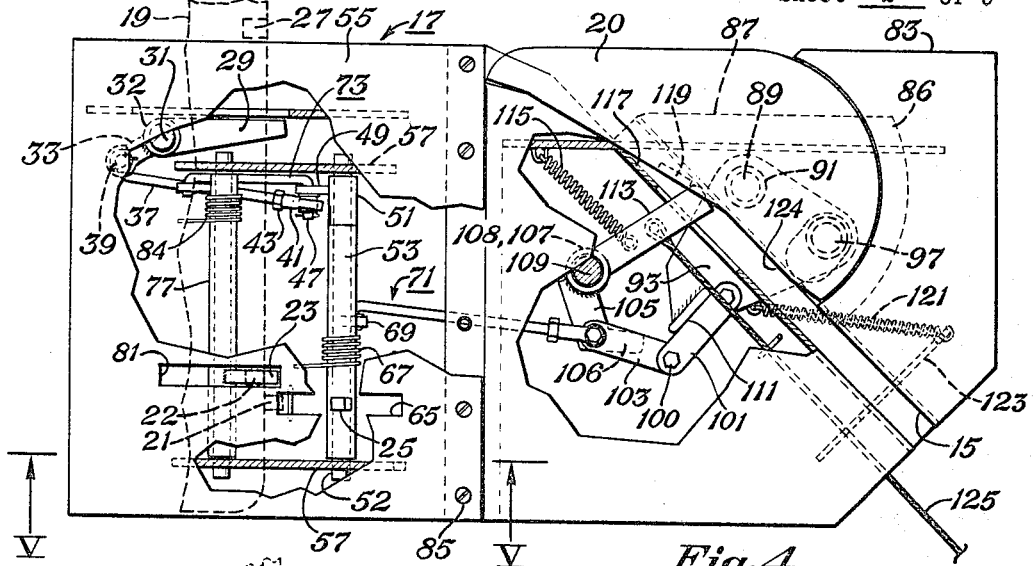
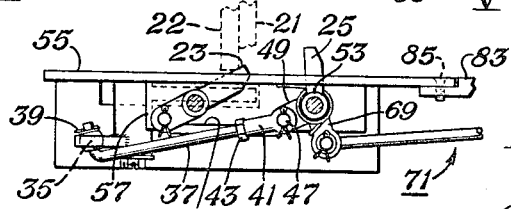
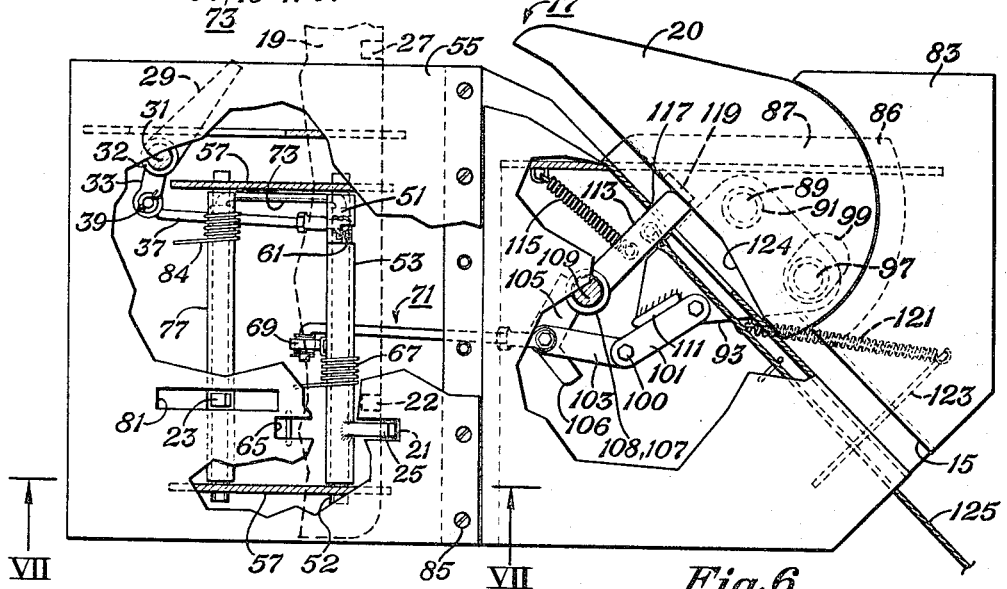
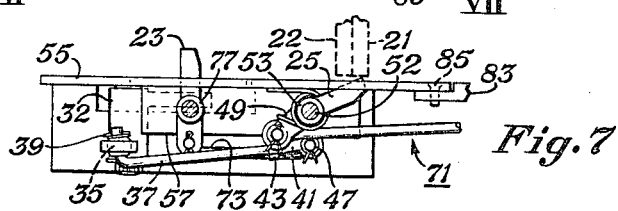

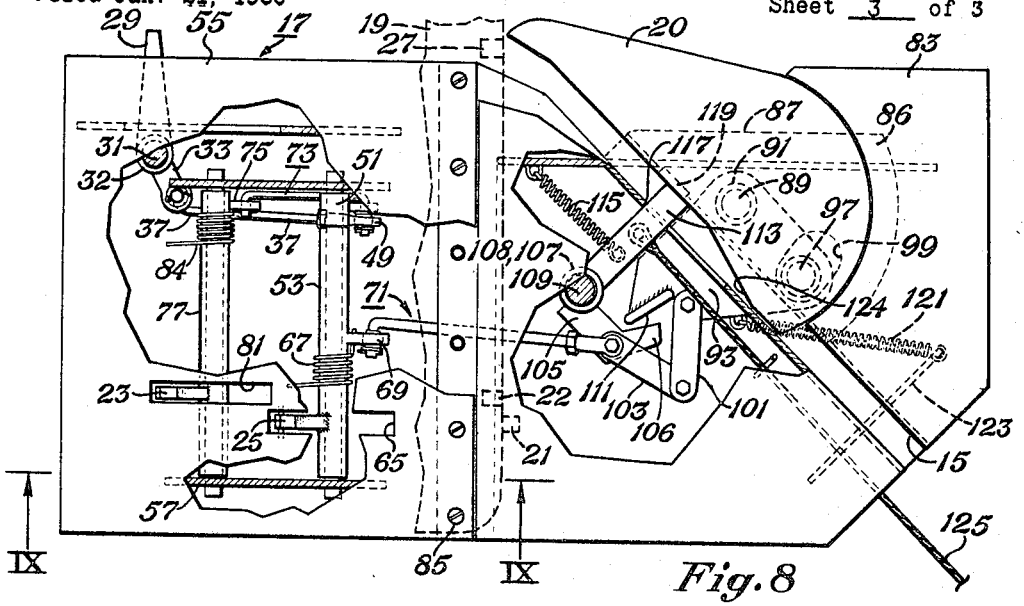
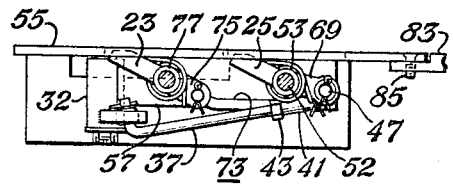

United States Patent Office 3,418,944
Patented Dec. 31, 1968

3,418,944
SUBFLOOR CONVEYOR SWITCH
CONTROL MEANS
William W. Hansford, Arlington, John F. Bryan, Jr., Irving, and Jesse B. Hutchinson, Dallas, Tex., assignors to M-H Equipment Company, Inc., Duncanville, Tex.
Filed Jan. 21, 1966, Ser. No. 522,288
5 Claims. (Cl. 104—130)

Our invention relates in general to conveyor systems, and in particular to switch apparatus in subfloor conveyor systems for automatically directing the tow pins of conveyor trucks into selected spur slots along a main floor slot.

One way to conveniently direct conveyor trucks along specific routes through a factory or plant is to provide a slot in the floor to receive and guide tow pins secured to the trucks. Conveyor means positioned in the slot engage the tow pins to propel the trucks, eliminating the need for locating space-consuming and potentially dangerous components above the floor. Additional slots, called "spur slots," are transversely aligned with respect to the main slot, and a switch apparatus is positioned in the vicinity of the intersection of each spur slot and the main slot to divert the tow pin, and thus the conveyor truck, into the spur slot.

Manual operation of the switch is often impracticable, and thus, automatic switch operation has been provided. One type of automatic switch utilizes two laterally spaced apart protrusions that move from subfloor to above-floor positions to engage laterally coded elements on the conveyor trucks. To help decrease the chances for accidental movements of the switch, both protrusions must be engaged by the coded elements to actuate the switch.

The specific control means used to implement such approaches have had disadvantages, even though they have seemingly performed satisfactorily. Ideally, the control means that raise the initially subfloor, lateral coded protrusions to above-floor positions should have rugged simplicity, reliability, and a minimum of mass movement. Excessive movements of the components lead to increased wear, accompanied by an increase in maintenance and repair costs. Moreover, the ideal switch control means should enable large numbers of combinations in the relative placements of the coded protrusion.

It is accordingly, the general object of our invention to provide improved switch control means for subfloor conveyor system switch apparatus.

Another object of our invention is to provide in subfloor conveyor systems, switch apparatus having improved control means of the type in which two laterally positioned coded elements on a conveyor truck must engage two laterally coded protrusions in the switch apparatus before movement of the switch can be effected by the conveyor truck.

Another object of our invention is to provide subfloor conveyor system switch apparatus with coded protrusions carried by a mechanism that enables a large number of coded placements of the protrusions to increase the number of spur slots with which the switch apparatus may be conveniently utilized.

Another object of our invention is to provide subfloor conveyor system switch control means in which a small amount of weight is moved on the initial engagement of the conveyor truck with the protrusions of the switch apparatus.

Another object of our invention is to provide a subfloor conveyor system switch apparatus which prevents accidental movements of the switch from its intentionally established position.

These and other objects are effected by our invention as will be apparent from the following description taken in accordance with the accompanying drawings forming a part of the application, in which:

FIG. 4 is a plan view showing another step in the sequence of operation of the switch apparatus;

FIG. 5 is a fragmentary view as seen looking along the lines V—V of FIG. 4;

FIG. 6 is a plan view showing a step in the sequence of operation of the switch apparatus;

FIG. 7 is a fragmentary sectional view as seen looking along the lines VII—VII of FIG. 6;

FIG. 8 is a plan view showing the position of the components of the switch apparatus immediately prior to the diversion of the conveyor truck into the spur slot; and FIG. 9 is a fragmentary sectional view as seen looking along the lines IX–IX of FIG. 8.

Figure 1:
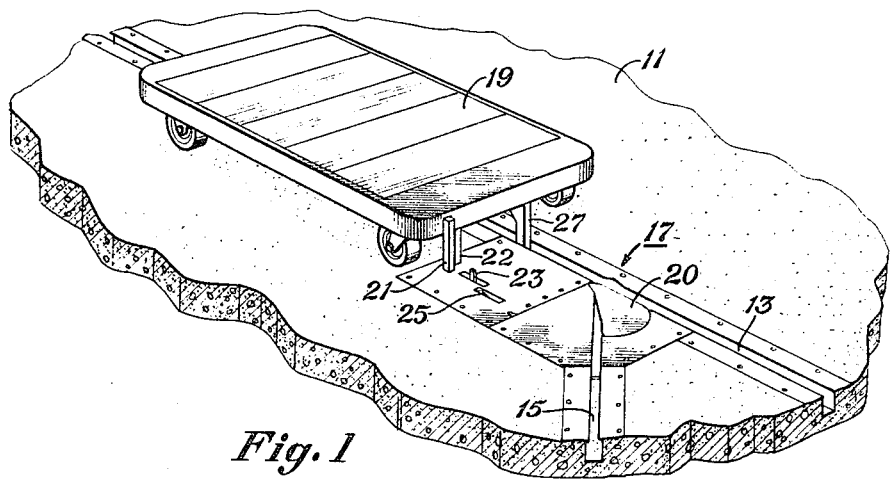
FIG. 1 is a fragmentary perspective view of a region of the floor in a factory or plant, including a main slot and one spur slot, switch apparatus, and a conveyor truck.

Referring initially to FIG. 1, the numeral 11 in the drawings designates the floor in a factory or plant having a main slot 13 and a spur slot 15. A switch apparatus 17 is mounted in the floor to divert selected ones of the conveyor trucks 19 into the spur slot 15. In FIG. 1 the switch 20 of the switch apparatus is shown in the "open main slot" or "closed spur" position. If the coded elements 21, 22 that depend from the front of the conveyor truck 19 engage primary and secondary protrusions 23, 25 of the switch apparatus, then the switch 20 will be moved to the "open spur" position to divert the conveyor truck 19 into spur slot 15.

Figure 2:
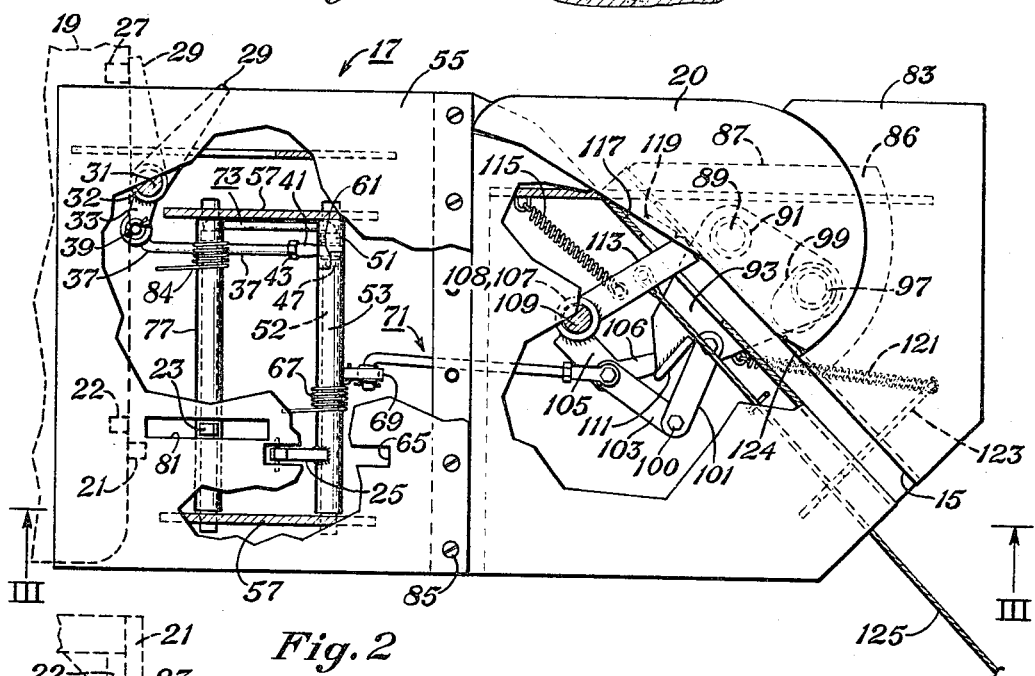
FIG. 2 is a plan view of the switch apparatus of FIG. 1, showing the positions of its components after an arming lever is engaged and moved by the tow pin of the conveyor truck.
Figure 3:
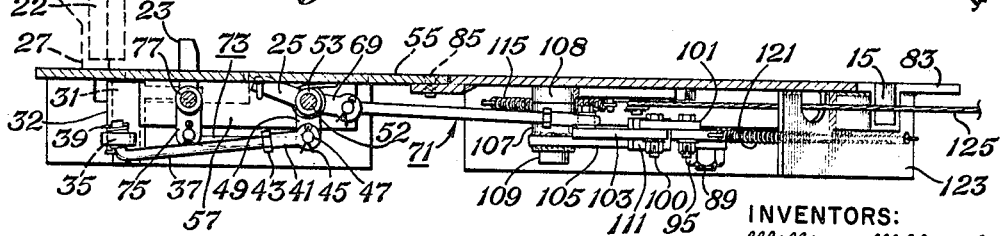
FIG. 3 is a sectional view as seen looking along the lines III—III of FIG. 2.

Referring now to FIGS. 2 and 3, the tow element or tow pin 27 (shown in phantom) of the conveyor truck 19 (also shown in phantom) is shown engaging an arming lever 29 that extends into the main slot 13, such lever being mounted for rotation about a vertical shaft 31 by means of a sleeve 32. In this instance the arming lever includes a shorter arm 33, which receives one rounded end 35 (see FIG. 3) of a connecting rod 37 that is retained thereon by suitable retainer means such as cotter key 39. The opposite end of the connecting rod 37 is adapted to receive a threaded adjustment sleeve 41, which is secured longitudinally by a fastener stop nut 43. The adjustment sleeve is rotatably secured, with the assistance of cotter key 45, to a shaft 47 extending from a short lever 49, which is rigidly connected to a stub rod 51 (which in this instance is a sleeve supported by an inner rod 52 (see FIG. 2)), the stub rod 51 being rotatably and coaxially secured to a secondary rod 53 and also carried by inner rod 52. Both the secondary rod 53 and the stub rod 51 are secured to a cover plate 55 of the switch apparatus by means of support brackets 57 and by the inner rod 52.

The stub rod 51 and secondary rod 53 have mutually opposed shoulders 61. When the arming lever 29 is initially engaged and rotated by the tow pin 27 (or before engagement therewith), the arming lever 29 and the connecting rod 37 rotate the stub rod 51 clockwise (as seen in FIG. 3). The secondary rod 53 is not rotated, however, because the shoulders 61 are initially separated. Thus, clockwise rotation of the arming lever 29 (as seen from above) pulls the connecting rod 37 to the left, initially rotating the stub rod 51, but not rotating the secondary rod 53.

The secondary protrusion 25 is carried by secondary rod 53 and is adapted to extend through an aperture 65 in cover plate 55, but initially resides in a "subfloor" position (as shown in FIG. 3). Secondary rod 53 has a coil spring 67 wrapped therearound with one end engaging cover plate 55 and the other end engaging an arm 69, which is one element of an actuating means 71 that is connected with the switch 20.

Linkage means 73 that includes a connecting rod secures the short lever 49 of the stub rod 51 to the short lever 75 that depends from a primary rod 77, which is rotatably secured to the support brackets 57 of the cover plate 55. The primary protrusion 23 is carried by primary rod 77 and is adapted to extend through an aperture 81 in cover plate 55. A coil spring 84 is placed around primary rod 77, having one end in engagement with the cover plate 55 and the other end in engagement with the short lever 75 to urge the protrusion 23 to a "subfloor" position.

When arming lever 29 is rotated clockwise (as seen from above) by engagement with the tow pin 27 of a conveyor truck, connecting rod 37 rotates the stub rod 51 clockwise (as viewed in FIG. 3). Since linkage means 73 in this instance forms a four-bar linkage between the stub rod 51 and the primary rod 77, the movements of arming lever 29 also cause the primary protrusion 23 of the primary rod 77 to move toward an "above-floor" position, as is illustrated in FIGS. 2 and 3. Eventually, the shoulders 61 of stub rod 51 and secondary rod 53 engage. This should occur when the primary protrusion 23 of primary rod 77 is in approximately the vertical position shown in FIGS. 2 and 3. Any additional clockwise rotation of the stub rod 51 will cause the secondary rod 53 to rotate in a clockwise direction (as viewed in FIG. 3). While the primary protrusion 23 is in the vertical position, coded element 22 (shown in phantom in FIGS. 2 and 3), if correctly positioned laterally, engages it, forcefully rotating the primary rod 77 and secondary rod 53. The arm 69 of the secondary rod is thus rotated, causing movements of the actuating means 71 of switch apparatus. From the above description it may be seen that the linkage means 73, which includes the short lever 49 and the stub rod 51 that is rotatably secured to the secondary bar 53, has a predetermined amount of slippage so that sequential movements of the protrusions are effected. There are a number of ways in which such slippage may be obtained, the one illustrated being, however, preferred.

Actuating means 71 which is adjustable longitudinally like connecting rod 37, is partially covered by a cover plate 83 that has the spur slot 15 formed therein. Cover plates 83, 55 are secured to each other by suitable fastener means such as set screws 85 and switch 20 is supported in a horizontal position by the support plate 87 (seen in phantom in FIG. 2), a portion of which is welded to the lower surface of cover plate 83, as indicated by the numeral 86.

A shaft 89 is secured to the lower surface of the switch 20, said shaft extending through an aperture in the support plate 87. Also, a rotatable cylindrical sleeve 91 surrounds the shaft 89 and is secured to an actuator plate 93, which is retained on the shaft by the nut 95 seen in FIG. 3. Thus, shaft 89 defines a vertical axis about which the switch 20 and the actuator plate 93 rotate. For rigidity, a second shaft means 97 extends through an elongated aperture 99 in support plate 87. Rotatably secured to the actuator plate 93 and to each other by fastener means 100, here bolts, are a series of arms 101, 103, 105 the latter being secured to a sleeve 107 that surrounds a shaft 109. When the actuating means 71 is pulled toward the left (as viewed in FIG. 2), arm 101 eventually engages a vertical face 111 on the actuator plate 93 to rotate the actuator plate 93 and the switch 20 clockwise (as viewed in FIG. 2) to the "open spur" position shown in FIG. 6. A latch 113 is also rotatably secured to a bushing 108 rotatably secured to shaft 109 and is urged by a tension spring 115 to a position to lock the switch 20 in the "open spur" position shown in FIG. 6. Specifically, the latch 113 engages the vertical edge of a vertical support plate 117 such that the end of the latch opposite the shaft 109 abuts a vertical plate 119 on the switch.

Therefore, the switch 20 is locked in the "open spur" position until the tow pin 27 of the conveyor truck engages and forces it away from the vertical plate 119 of the switch 20. Another tension spring 121 is secured to the actuator plate 93 and to a vertical support plate 123 so that once the latch 113 is moved from its locking position, the switch plate is urged counterclockwise to the "closed spur" position. To facilitate this movement, a cam surface 124 is formed on the switch 20. A small cable 125 is secured to the latch 113 and to an overload prevention device (not shown) so that when the spur is filled to capacity, the cable 125 is urged in a direction to prevent the latch 113 from engaging the vertical plate 119 on switch 20 to further prevent the switch from staying in an "open spur" position and to let the conveyor truck continue traveling down the main slot, even though its coded elements 21, 22 have instantaneously actuated and moved the switch 20 to the "open spur" position.

The extremity of a finger 106 that extends from arm 105 of the actuating means engages the rear of vertical face plate 111 of actuator plate 93 (see FIG. 2) to jam the switch 20 in the "closed spur" position prior to the upward movement of secondary protrusion 25. When secondary protrusion 25 is moved upward to the position shown in FIG. 4, however, the extremity of finger 106 is moved by actuating means 71 away from the rear of the vertical face plate 111 of actuator plate 93. Hence, the switch is free to move to the "open spur" position shown in FIG. 6 responsive to engagement of secondary protrusion 25 by coded element 21. When the switch 20 moves to the "closed spur" position, after the conveyor truck enters spur slot 15, then the back of finger 106 is momentarily engaged by the vertical face 111 of actuator plate 93 and pushed clockwise as seen in FIG. 8. Thus, the extremity of finger 106 is forced to the rear of vertical face 111, thereby locking the switch 20 once again in the "closed spur" position. This feature of our invention prevents accidental movement of the switch 20 to the "open spur" position.

An overall operational description of our control means and switch apparatus is as follows:

A conveyor truck 19 proceeding along the main slot 13 will engage and rotate the arming lever 29 (see FIG. 2) that extends into the main slot. The resulting movement of the arming lever 29 urges the connecting rod 37 to the left, as seen in FIG. 2, to rotate the stub rod 51 connected with secondary rod 53 clockwise, as viewed in FIG. 3. Since the mating shoulders 61 of the stub rod and secondary rod 51, 53 are spaced apart initially, there is no immediate rotation of the secondary rod 53, and secondary protrusion 25 remains in a subfloor position. Since linkage means 73 connects the stub rod 51 with the primary rod 77, the primary rod 77 immediately begins to rotate in a clockwise direction, as viewed in FIG. 3, so that primary protrusion 23 begins to move toward an "above-floor" position, as shown in FIG. 3. If properly coded by lateral placement, the coded element 22 of the conveyor truck engages the primary protrusion 23 and further rotates the primary rod 77. Since the axially extending shoulders 61 of the stub rod and secondary rod 51, 53 have now engaged, further rotation of the primary rod, acting through the linkage means 73, causes rotation of the secondary rod 53 and moves its protrusion 25 to an "above-floor" position, as seen in FIGS. 4 and 5, and releases finger 106 from the rear face plate 111 of the actuator plate 93. The coded element 21 of the conveyor truck may now engage the secondary protrusion 25 to forcefully rotate the secondary rod 53. Such rotation of the secondary rod 53 urges the actuating means 71 forcefully to the left as viewed in FIG. 4 until one side surface of the arm 101 is forced into engagement with the vertical face plate 111 of the actuator plate 93. Continued rotation of the secondary rod 53, responsive to forceful engagement of coded element 21 with the protrusion 25, continues to urge the linkage means 71 to the left and forces the switch 20 to assume the "open spur" position shown in FIG. 6.

At this stage, the tension spring 115 urges the latch 113 to a position to oppose and engage the vertical plate 119 secured to the switch 20 to lock the switch in the "open spur" position. The tow pin 27 of the conveyor truck will now be deflected by the extremity of the switch 20 to follow a path through the spur slot 15. Once the coded element of the conveyor truck moves forward sufficiently to release the protrusion 25 of the secondary rod 53, the primary and secondary rods 77, 53, rotate under the influence of springs 67, 84 in a counterclockwise direction (as seen in FIGS. 8 and 9) until the protrusions 23, 25 assume subfloor positions, where they reside until moved by another conveyor truck traveling along the main slot 13.

Once the tow pin 27 of the conveyor truck is deflected into the spur slot by the extremity of the switch 20, it eventually engages and rotates the latch 113 clockwise as viewed in FIG. 8 (such that its extremity no longer engages the vertical plate 119), thus enabling the switch 20 to rotate counterclockwise (as viewed in FIG. 8) to the closed spur position seen in FIG. 1. This movement is further effected by the engagement of tow pin 27 with the cam surface 124 on the switch 20. The finger 106 of arm 105 is moved by engagement with the rear of face plate 111 back to a position to lock the switch 20 in its "closed spur" position until once again opened by the passage of a conveyor truck having properly positioned coded elements 21, 22, as was explained previously.

The cable 125 is connected with an overload prevention device (not shown) that prevents conveyor trucks from entering the spur slot 15, even though the coded elements 21, 22 actuate the switch. The cable 125 prevents the latch 113 from locking the switch 20 in the open spur position, as was explained previously.

It should be apparent to those skilled in the art that significant advantages derive from the use of our subfloor conveyor switch control means. The use of substantially parallel primary and secondary rods, each of which carries a protrusion, is an advantageous way to provide switch control means that may conveniently have one hundred or more coded combinations. For example, protrusions 23 of primary rod 77 may easily have ten different lateral positions, as may the protrusions 25 of the secondary rod 53. Thus, there are one hundred combinations of positions which the protrusions 23, 25 may assume with respect to each other. In addition, more than two parallel such rods may be utilized to enable an even greater number of coded combinations.

The provision of a locking device for locking the switch 20 in the "closed spur" position prior to movements thereof by the passage of a conveyor truck prevents accidental movements of the switch to the "open spur" position. It would be possible, for example, for a workman to accidentally move the switch 20 to the open spur position by walking across the switch were it not for such locking means. Therefore, users of the switch are assured that a conveyor will be directed into the spur slot 15 only upon intentional actuation of the switch 20.

Since the arming lever 29 need only raise the primary protrusion 23 of the primary rod 77, the arming lever does not have to move a large mass. It is the engagement of the coded element 22 with the primary protrusion 23 that moves the secondary protrusion 25 to the "above-floor" position. Irrespective of the number of parallel bars used, the arming lever need only lift a primary protrusion. In addition, such sequential operation enables the coded elements of the conveyor truck to be spaced closer together longitudinally than would be possible than if the sequential operation were not used, a feature which simplifies the installation of the coded elements on the conveyor trucks. If there were no sequential operation, the coded elements of the conveyor truck would have to be separated the same distance longitudinally as are the primary and secondary protrusions, because the protrusions would have to be engaged substantially simultaneously by the coded elements.

While we have shown our invention in only one form, it should be apparent to those skilled in the art that it is not so limited, but is susceptible of various changes and modifications without departing from the spirit thereof. The relative positions of the primary and secondary protrusions 23, 25 may easily be reversed, for example. That is, the secondary protrusion and its support means may be moved to a position closest to an oncoming truck, and the primary protrusion would thus be positioned farther-est from an oncoming truck. The coded elements on the conveyor truck would be spaced such that the primary protrusion is engaged first in the event sequential operation is utilized.

Also, our invention in its broader aspects is not limited to the lost motion mechanism illustrated and described as a specific means to produce sequential movements of the protrusions. This and other structures previously described can take a variety of forms within the scope of our invention.

We claim:

1. In a subfloor conveyor system having conveyor means beneath a main floor slot for propelling conveyor trucks along the surface of a floor by engaging a tow pin that depends from each conveyor truck, and a switch for guiding selected conveyor trucks into a spur slot, the combination therewith of:
  (a) two substantially parallel bars rotatably mounted beneath said floor to extend transversely with respect to the path of travel of said conveyor trucks, each said bar having a protrusion that extends through an aperture in said floor;
  (b) linkage means joining said bars to cause simultaneous rotations of said bars when either is rotated;
  (c) an arming lever positioned to extend across said main floor slot;
  (d) a connecting rod joining said arming lever with one of said bars to rotate said bars and move their protrusions above the floor when said arming lever is engaged by the tow pin of a conveyor truck; and
  (e) actuation means connecting one of said bars with said switch to move said switch to a selected position upon engagement of the encoder elements of said truck with the protrusions of said bar.

2. The system defined by claim 1 wherein the linkage means joining said bars has a predetermined amount of slippage so that only the protrusion of one bar initially rotates to an above-floor position, where it may be forcefully engaged by a coded element of a conveyor truck to effect movement of the other of said protrusions to an above-floor position, said latter protrusion then being engageable by another coded element of said conveyor truck to actuate said switch.

3. The apparatus defined by claim 2 wherein said slippage in said linkage means is effected by rotatably mounting a stub rod coaxially to a selected one of said parallel rods, with said stub rod and said selected rod having mutually opposed axially extending shoulders that engage upon rotation of said selected rod a predetermined number of degrees.

4. Control means for actuating the switch of a subfloor conveyor system of the type that includes conveyor means in a floor slot for receiving the tow pin of a conveyor truck and protrusions engageable by coded elements on a conveyor truck to activate said switch, said apparatus comprising:
  (a) a support structure;

(b) an arming lever carried by said support structure to extend into the slot of a subfloor conveyor system and into the path of a conveyor truck;

(c) a primary protrusion carried by said support structure to rotate between subfloor and above-floor positions;

(d) means connecting said primary protrusions with said arming lever to move said primary protrusion to an above-floor position upon movement of said arming lever by said tow pin;

(e) a secondary protrusion carried by said support structure to rotate between subfloor and above-floor positions;

(f) means connecting said secondary protrusion with said primary protrusion to move said secondary protrusion to an above-floor position when an encoded element of a conveyor truck engages and rotates said primary protrusions; and (g) means connecting said secondary protrusion with said switch to actuate said switch responsive to movements of said secondary protrusion when engaged and rotated by a coded element of said conveyor truck.

5. In a subfloor conveyor system having conveyor means beneath a main floor slot for propelling conveyor trucks along the surface of a floor by engaging a tow pin that depends from each conveyor truck, and a switch for guiding selected conveyor trucks into a spur slot, the combination therewith of:

(a) protrusion means supported by said switch apparatus for moving said switch to a selected position;

(b) coded elements carried by said conveyor truck to engage said protrusion means to move said switch to said selected position;

(c) a locking device carried by said switch apparatus to engage a portion of the switch and prevent its movement to said selected position; and (d) actuating means connecting at least one of said protrusions and the locking device to move the locking device to an unlocking position when a conveyor truck moves said protrusions, thus enabling the switch to be moved to its selected position.

References Cited

UNITED STATES PATENTS

| | | | |
|---|---|---|---|
| 3,223,048 | 12/1965 | Gorjanc | 104—130 |
| 3,314,376 | 4/1967 | Lerch et al. | 104—130 |
| 3,331,506 | 7/1967 | Smith et al. | 104—130 |

ARTHUR L. LA POINT, *Primary Examiner.*

R. A. BERTSCH, *Assistant Examiner.*